United States Patent Office 2,906,590
Patented Sept. 29, 1959

2,906,590

PRINTING OF TEXTILE MATERIALS

Cyril George Evans, Clemson, S.C., assignor to Deering Milliken Research Corporation, near Pendleton, S.C., a corporation of Delaware No Drawing. Application May 5, 1954
Serial No. 427,871

11 Claims. (Cl. 8—62)

This invention relates to pastes for the printing of textile materials, methods for preparing printing pastes, and to methods for employing the same, and more particularly the invention relates to printing pastes suitable for use with polyacrylic materials.

Printing pastes have been employed for many years for the localized coloration of textile materials. The usual printing paste comprises a dye or pigment with an affinity for the textile material to be printed, a carrier for the coloring material generally consisting of water and glycerin or a similar organic solvent for the dyestuff, and a thickening agent such as starch or a natural gum. Such pastes are conventionally applied in any desired pattern by means of an engraved roll or block, by means of a stencil, or even in some instances by hand. The printed material is thereafter dried, the dye fixed and the material scoured to remove the thickener, glycerin and other such ingredients of the printing paste.

Printing, such as described above, is highly successful with the natural fibers showing a strong affinity for dyestuffs, but with the recently developed synthetic fibers having only a weak affinity for dyes, conventional printing pastes are completely inadequate. It has, for example, been found to be practically impossible to employ conventional printing pastes in the printing of polyacrylic materials and this is particularly true when deep shades of coloration are desired.

Because of the difficulties encountered in the printing of synthetic textiles with conventional printing pastes, attempts have been made to develop special techniques and special pastes for printing such materials. A process, first employed with glass fibers, wherein a dye or pigment is mixed with a polymeric resin forming material and the resulting mixture applied to the textile has met with some degree of success but as is well known to those skilled in the art, synthetic resins when applied to textiles generally give an undesirable hand and when one attempts to employ printing pastes containing the same, the printed area generally has a stiffer hand than the unprinted areas thereby resulting in an undesirable fabric. In addition, since printing by such techniques is strictly a surface effect and there is substantially no penetration of the fibers by the dye or pigment, the resulting prints are often not as fast to light and washing as might be desired.

It is a primary object of this invention to provide printing pastes capable of improved printing on polyacrylic textile materials.

Another object of the invention is to provide printing pastes capable of producing printed areas on polyacrylic materials substantially unchanged in hand from the unprinted material.

A further object of the invention is to provide printing pastes capable of producing prints of excellent fastness to light and washing.

Still another object of the invention is to provide methods whereby the novel printing pastes can be advantageously employed in the printing of polyacrylic materials.

According to this invention there is employed for the printing of polyacrylic textile materials an activated printing paste prepared from materials comprising a dyestuff of the class generally referred to as "acid dyes," a water soluble cupric salt, and a phenolic compound capable of being represented by the formula:

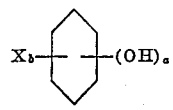

wherein X is a radical selected from the group consisting of hydrogen, hydrocarbon radicals, carboxy groups, and halogen radicals, $a$ is an integer from one to three inclusive and $b$ is an integer from one to two inclusive, the sum of $a$ and $b$ not exceeding 3. Details for the activation of a paste prepared from such materials are given in subsequent paragraphs.

The invention is applicable to all types of polyacrylic textile materials containing fibers composed entirely or largely of polyacrylonitrile. The textile material may take the form of filaments, yarns, woven cloth, knitted material or any other form on which one might desire to conduct a printing operation. It should also be understood that the invention is applicable to yarns, cloth or the like prepared from mixtures of polyacrylic fibers and other types of fibers such as illustrated by wool, nylon and rayon fibers and it is intended that all such blends be included within the term "polyacrylic textile materials" as employed in this specification and claims. Polyacrylic textile materials are produced by a number of manufacturers and are marketed under a variety of tradenames such as illustrated by Orlon and Acrilan.

There can be employed in the preparation of the new pastes of this invention any one or more of the class of dyes generally referred to as "acid dyes" and this phrase is employed in its broadest sense to include the recently developed dyestuffs chemically similar to the older acid dyes but which are best employed in a neutral dye bath. Illustrative acid dyes which may suitably be employed are Anthraquinone Blue SKY (C.I. 1088), Anthraquinone Green GN (C.I. 1078), Orange II (C.I. 151), Quinoline Yellow PN (C.I. 802), Anthraquinone Blue RA, Anthracene Blue WR (1,2,4,5,6,8-hexahydroxyanthraquinone), as well as many other dyes. Suitable dyes are also sold under various trade names such as Roracyl Orange R, Roracyl Dark Green B, Pontacyl Fast Red AS (C.I. 176), Pontacyl Rubine R (C.I. 179), Roracyl Violet 2R, Cuprofix Yellow GL (Prototype 526), and Cuprofix Violet 2BC. The quantity of dyestuff employed in the paste depends entirely upon the shade of color one happens to desire and can constitute up to 20% or more of the weight of the paste for the printing of very dark shades. It should also be emphasized that if one is dyeing material composed of a blend of polyacrylic fibers with other fibers, dyestuffs known to have an affinity for the other component of the blend may also be included within the paste. For instance, in dyeing a blend of polyacrylic fibers and acetate rayon fibers the printing paste may contain one or more acid dyes for the acrylic fibers and one or more acetate dyes for the rayon fibers.

As may be seen from the above generic formula, the chemical nature of the phenolic compound may vary within reasonably wide limits. Specific examples of suitable phenolic compounds which may be employed in the preparation of the new printing paste of this invention include para-cumylphenol, tertiary butyl catechol, salicylic acid, pyrogallic acid, 4-(a-methylbenzyl)-2-phenylphenol, ortho, meta and para-phenylphenol, phenol, cresol, 4 - tertiary - butyl - 2 - phenylphenol, octylphenol, nonylphenol, 4,4'-isopropylidenebis(2-isopropylphenol), resorcinol, thymol as well as ortho, meta and para-chlorophenol, p,p'-isopropylidene-diphenol, and p,p'-sec.-butylidenediphenol. Phenolic compounds having two or more aromatic nuclei as illustrated by the phenylphenols are generally advantageous and, in fact, para-phenylphenol is the preferred phenolic compound for use in the new printing pastes.

Substantially any water soluble cupric salt can satisfactorily be employed in the preparation of the new printing pastes since it is apparently only necessary that the salt be capable of producing cupric ions. Illustrative examples of suitable salts include cupric chloride, cupric sulfate, cupric nitrate, and cupric acetate. It has however been found that for unknown reasons cupric sulfate generally results in printing pastes of superior qualities, when employing dyes recommended for use with sulfuric acid, and for this reason this salt of copper is generally preferred for use with such dyes. Since cupric sulfate is commercially available at a low price it is also generally preferred for the reasons of economy and convenience. However, when employing dyes recommended for use with acetic acid, the use of cupric acetate usually gives superior results. The amount of the cupric salt to be employed may vary within wide limits and from about 10% to 1000% based upon the weight of dyestuff may generally be employed with satisfactory results. As a rule, better penetration is obtained when an excess of the cupric salt is employed and for this reason the preferred range, except under special circumstances to be subsequently described, is from about 100% to 500% based upon the weight of dyestuff.

A thickening agent is generally employed in the preparation of the new printing pastes to give the desired consistency and any of those materials customarily employed for this purpose in the preparation of conventional printing pastes is satisfactory. Illustrative examples of suitable materials are starches, gum arabic, or other Arabian type gums, gum tragacanth or other bassorin-type gums and synthetic thickeners as illustrated by sodium carboxymethyl cellulose. The amount of thickener to be employed depends entirely upon what method of printing is to be employed and upon personal taste as will be fully understood by those skilled in the art.

When printing mixtures of acrylic fibers and wool, special problems exist since high concentrations of cupric salt undesirably stain the wool. It has been surprisingly found, however, that such staining can generally be eliminated to a very large extent if the amount of copper salt is held reasonably low for instance from about 50% to 150% based upon the weight of dyestuff and there is additionally added a reasonably large quantity of a water soluble alkali metal salt such as for instance sodium sulfate or sodium acetate. Apparently the alkali metal salt is absorbed by the wool fibers in preference to the copper salt so that no staining of the wool results. As a general rule the preferred quantity of alkali metal salt to be employed in the printing of wool blends is from 5% to 35% of the weight of the wool in the areas to be printed or from about 50% to 600% by weight of the dyestuff.

A second difficulty in the printing of wool-acrylic blends is that there is a tendency for the wool to absorb such large quantities of dyestuff that there is an insufficient quantity remaining to properly color the acrylic fibers. It has surprisingly been found that this can to a large extent be eliminated by adding to the paste a small quantity of an alkali metal alkyl sulfate wetting agent and a small quantity of furfuryl alcohol. Almost any of the commercially available alkyl sulfate wetting agents can be employed but sodium tetradecyl sulfate, sold under the trade name of Tergitol 4, has been found to be especially advantageous and is preferred. The amount of wetting agent to be added depends upon the amount of paste to be applied to the wool blend and the area to be printed. The wetting agent should not be applied to the wool in quantities greater than about 4% by weight of the wool since larger quantities result in undue felting of the wool blend. From about 3 to 4% of the alkyl sulfate salt, based upon the weight of the wool in the areas to be printed, generally constitutes the preferred range. The amount of furfuryl alcohol to be added also depends upon the weight of wool fibers in the areas to be printed. As a general rule not more than 10% furfuryl alcohol based upon the weight of wool fibers in the printed areas should be employed since large quantities result in the wool blend having an undesirably harsh hand. As a general rule the preferred quantity of furfuryl alcohol is from 2 to 7% by weight of the wool to be printed.

The remainder of the constituents of the printing paste are conventional and generally include an organic solvent to aid in dissolution of the dyes and to prevent the dyestuff from spreading, and sufficient water to give the paste the proper consistency for the particular method of printing to be employed. Conventional organic solvents for dyestuffs and printing pastes include diethylene glycol, glycerin, thiodiglycol and 2-ethoxyethanol. As a rule when printing woolen materials, improved results are obtained by employing a hygroscopic material such as diethylene glycol or glycerin.

To prepare the new printing paste of this invention all of the ingredients of the paste can simply be mixed together and the resulting mixture boiled with agitation to result in homogeneity. Preferably however the metallic salts employed are first dissolved in the desired quantity of water and this solution then added to a mixture of the other ingredients of the printing paste. This eliminates the difficulty which might otherwise be encountered of obtaining complete dissolution of the inorganic salts.

For best results the phenolic compound should be employed in as finely a divided form as is possible. In certain instances phenolic compounds suitable for use in the preparation of the new printing pastes are commercially available in the form of finely divided powders and in these instances the powdered form of the phenol can be employed with excellent results. In most instances, however, it is preferable to prepare the phenol as an aqueous dispersion before mixing it with the other ingredients of the printing paste. A suitable method for preparing phenolic dispersions capable of giving excellent results in the preparation of the new printing pastes is disclosed in my co-pending application Serial Number 385,682, filed October 12, 1953, now Patent No. 2,812,230, and comprises boiling the phenol with furfuryl alcohol and thereafter forming an aqueous dispersion of the phenol-alcohol mixture in a colloidal mill or the like. Other methods for forming a fine dispersion of the phenolic material are equally satisfactory if a sufficiently small particle size results.

To enable one to obtain a proper fixation of the dyestuff upon the synthetic fibers it is necessary that the printing paste be properly activated and this is accomplished by heating the paste, or a mixture of certain essential ingredients thereof, at elevated temperatures. If desired, all of the ingredients of the paste can be mixed together prior to the activation operation and, indeed, this is the preferred procedure for reasons of convenience. However, it is not necessary that all ingredients be present and satisfactory results are obtained if the mixture contains only the dye, the cupric salt, the phenol and sufficient water to act as a vehicle for the other materials.

The exact mechanics of the activation step are not fully understood but it is quite apparent that a very important physical or chemical change takes place in one or more of the ingredients of the paste. It is believed to be possible that the dyestuff, under the influence of the phenol, forms a complex with the cupric ions during the activation procedure or it might be that a complex between the phenol and the cupric ions is formed. Regardless, however, of what specific change or changes take place, it has been found that unless the printing paste is properly activated, the dyestuffs will not become properly affixed to the polyacrylic fibers and will, to a large extent, be removed by the scouring operation.

The temperature of heating for activation of the paste can be from about 200° F. to 300° F. with the preferred range being from about 215° F. to 260° F. At the lower temperatures, the activation can be accomplished by simply heating in an open vessel but at higher temperatures, since the paste is an aqueous mixture, it is necessary that a pressure vessel be employed. Preferably the mixture should be thoroughly agitated during the entire heating operation and this can be accomplished simply by allowing the mixture to boil vigorously or, if desired, mechanical agitation can be provided. The length of time required for activation depends upon the temperature of heating with shorter times being required at higher temperatures. For example at about 215° F., the dye paste should be boiled for a minimum of about 30 minutes to one hour and preferably for at least about 2 hours. On the other hand at a temperature of approximately 250° F. a satisfactory paste can be prepared by heating for only about 10 minutes. Appropriate times for other temperatures vary accordingly.

After the printing paste has been properly activated it can be applied to the material to be printed by any conventional procedure. By adjusting the consistency of the paste to a proper value it can readily be employed in machine printing, screen printing, or in hand printing. Likewise the paste can be employed in warp printing where desired. Since the paste can be applied to textile materials by entirely conventional procedures, it is believed that those skilled in the art will have little difficulty.

After the paste has been applied to the textile material, the material is dried and the printed fabric treated with dry steam to fix the dyestuff to the synthetic fibers. It is believed that this is the first instance in which it has been possible to cause an acid dyestuff to become permanently affixed to a polyacrylic fiber without prolonged boiling in a dye bath. The steam applied to the printed textile material should preferably be substantially saturated but should contain no excess moisture and may be at any desired pressure up to about 15 or 20 pounds which does not inherently damage any of the fibers in the textile material. For example when steaming mixtures of wool and Orlon, the pressure of the steam should be maintained at below about 6 pounds per square inch gauge since the wool inherently suffers if higher temperatures are employed. The length of time required for the steaming operation is very short and it has been found that the dyestuff is adequately fixed to the synthetic fibers in only 1 to 3 minutes of steaming. Of course, longer periods of steaming may be employed if desired and in some instances it has been found that better penetration is obtained if the steaming step is conducted for from 5 to 30 minutes. The actual procedure of steaming is substantially conventional in nature and can be conducted in any apparatus usually employed for the steaming of printed textiles such as, for example, a cottage steamer or an ager.

The invention will now be illustrated by the following specific examples in which all parts are by weight unless otherwise indicated:

*Example I*

In a suitable vessel there are mixed 40 parts by weight of Roracyl Dark Green B, 10 parts by weight of Anthraquinone Blue SWF Conc. 150%, 7 parts by weight of Du Pont Orange RO, 25 parts by weight of para-phenylphenol (finely powdered), 25 parts by weight of glycerin and 150 parts by weight of a 6% aqueous solution of gum tragacanth, and the resulting mixture is then added to an aqueous solution containing 75 parts by weight of copper sulfate dissolved in approximately 500 parts by weight of water. The mixture is then placed in a suitable pressure reaction vessel and vigorously boiled under a pressure of approximately 15 p.s.i.g. for a period of about 45 minutes.

A sample of woven material composed 100% of polyacrylic fibers (Orlon) is prepared for printing by scouring and the resulting fabric is then hand printed with the above dye paste in such a manner as to result in there being applied to a given area of the fabric approximately 10%, based upon the weight of fabric in the printed areas, of dyestuff. The printed fabric is then dried and steamed at 15 pounds per square inch gauge for 3 minutes and is thereafter scoured and dried. Examination of the printed fabric shows the printed areas to be dyed an excellent black with excellent fastness to light and washing.

*Example II*

Into a reaction vessel equipped with a thermometer and reflux condenser there is placed 10 parts of monomeric furfuryl alcohol. The furfuryl alcohol is heated to its boiling point and thereafter there is added 20 parts of para-phenylphenol over a period of about 45 minutes. The mixture is thereafter boiled for an additional 15 minutes and is then cooled to give a straw colored solid. The solid is mixed with an equal volume of water and 1% by weight of a wetting agent (Triton 770) and the resulting mixture formed into a paste-like phenolic dispersion by passage through a colloidal mill.

In a suitable reaction vessel there is placed 40 parts by weight of Roracyl Dark Green B, 10 parts by weight of Anthraquinone Blue SWF conc. 150%, 7 parts by weight of Du Pont Orange RO, 35 parts by weight of monomeric furfuryl alcohol, 7 parts by weight of a sodium alkyl sulfate wetting agent (Tergitol 4), 25 parts by weight of glycerin, 150 parts by weight of a 6% solution of gum tragacanth, and 100 parts by weight of the above prepared phenolic dispersion. The resulting mixture is then slowly mixed with an aqueous solution containing 40 parts by weight of cupric sulfate and 100 parts by weight of sodium sulfate dissolved in 550 parts by weight of water. After thoroughly mixing to obtain as nearly a homogeneous mixture as possible, the mixture is boiled in an open vessel for 3 hours at the end of which time it is cooled and adjusted to the proper consistency for machine printing by the addition of additional water and gum tragacanth solution. The resulting printing paste is then employed in the machine printing of warp yarn comprising 55% polyacrylic fibers (Orlon) and 45% wool fibers. The thus printed yarn is dried and wound into a loose package which is then placed in a steam oven and steamed at 6 p.s.i.g. for 1 hour and 15 minutes at the end of which time it is scoured and dried. Upon examination both the wool and polyacrylic fibers in the yarn are found to have been dyed an excellent black.

*Example III*

In a suitable reaction vessel there are mixed .033 part by weight of Roracyl Dark Green B, 10 parts by weight of Du Pont Orange RO, 1.66 parts by weight of Pontacyl Fast Red AS extra conc., 4 parts by weight of glycerin, 42 parts by weight of a 6% aqueous solution of gum tragacanth, and 33 parts by weight of the phenolic dispersion of Example II. The resulting mixture is then added to an aqueous solution containing 30 parts by weight of cupric sulfate dissolved in 200 parts by weight of water and the mixture boiled vigorously for 1 hour. The resulting printing paste is then adjusted to the proper consistency by the addition of additional water and gum tragacanth and employed for the machine printing of a fabric composed of 100% polyacrylic fibers (Orlon). The fabric is dried and thereafter steamed at 3 p.s.i.g. for 20 minutes. Examination of the printed fabric after scouring and drying shows the printed areas to be dyed an excellent rust red.

Example IV

Into each of a plurality of reaction vessels equipped with thermometers and reflux condensers there is placed 5 parts by weight of monomeric furfuryl alcohol and the alcohol heated to the boil. There is then slowly added to each of the reaction vessels a selected phenol over a period of about 45 minutes. Phenolic compounds which are employed in this test include para-cumylphenol, para-phenylphenol, tertiary butyl catechol, beta-naphthol, 4-(alpha-methylbenzyl)-2-phenylphenol, 4-tertiary butyl-2-phenylphenol, resorcinol, octylphenyl, phenol, p,p'-isopropylidenebis(2-isopropylphenol), nonylphenol, cresol and thymol. After the phenol has been added in each instance the reaction mixture is boiled for an additional 30 minutes. The reaction mixtures are then cooled and in each instance mixed with an equal volume of water containing 1% of a wetting agent (Triton 770) and the mixture formed into a paste-like dispersion by passage through a colloidal mill.

Example III above is repeated a number of times except that in each instance there is substituted one of the phenolic dispersions prepared above. Good to excellent results are obtained in all instances with best results being obtained from printing pastes employing para-cumylphenol, and p,p' - isopropylidenebis(2 - isopropylphenol).

Example V

Example II is twice repeated except that in the first instance there is substituted for the cupric sulfate an equal weight of cupric nitrate and in the second instance there is substituted an equal weight of cupric acetate. Prints obtained with the resulting pastes are satisfactory but it is apparent from a comparison of the result with those obtained in Example II that cupric sulfate is preferred in this instance.

Having thus described my invention what I claim and desire to secure by Letters Patent is:

I claim:

1. A method of preparing a printing paste which method comprises heating at a temperature of from about 210 to 300° F. a mixture comprising an acid dyestuff, a water soluble cupric salt, a water soluble alkali metal salt selected from the group consisting of alkali metal salts of inorganic acids and alkali metal salts of the lower fatty acids, and a phenol represented by the formula:

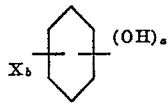

wherein X represents at least 1 radical selected from the group consisting of hydrogen, hydrocarbon radicals, carboxy groups, and halogen radicals, $a$ is an integer from 1 to 3 inclusive and $b$ is an integer from 1 to 2 inclusive, the sum of $a$ and $b$ not exceeding 3.

2. The method of claim 1 wherein said phenolic compound is a phenylphenol.

3. A method as in claim 2 wherein the phenol is p-phenylphenol.

4. The method of claim 2 wherein said composition contains in addition a hygroscopic solvent for the dye, furfuryl alcohol and an alkyl sulfate wetting agent.

5. The method of claim 4 wherein the phenol is p-phenylphenol, the cupric salt is cupric sulfate, the hygroscopic solvent is glycerin and the wetting agent is sodium tetradecyl sulfate.

6. A method according to claim 2 wherein said alkali metal salt is sodium sulfate.

7. A method according to claim 6 wherein said water soluble cupric salt is cupric sulfate.

8. An activated printing paste prepared according to claim 1.

9. An activated printing paste prepared according to the method of claim 2.

10. A method according to claim 2 wherein said heating is conducted under super atmospheric pressure.

11. A method for printing a polyacrylic textile material which comprises depositing thereon a composition according to claim 8 and thereafter subjecting said material to the action of steam.

References Cited in the file of this patent

UNITED STATES PATENTS

| | | |
|---|---|---|
| 2,653,074 | Blaker | Sept. 22, 1953 |
| 2,743,991 | Schoonover | May 1, 1956 |
| 2,796,318 | Evans | June 18, 1957 |

FOREIGN PATENTS

| | | |
|---|---|---|
| 850,135 | Germany | Sept. 22, 1952 |
| 1,027,995 | France | Feb. 25, 1953 |

OTHER REFERENCES

Venkataraman: Synthetic Dyes, vol. 1, 1952, Academic Press, N.Y., pp. 288–289.

"Organic Chem.," by Paul Karrer, 2nd Eng. ed., 1946, p. 411, by Elsevier Pub. Co.

Rayon and Synth. Tex. for October 1951, pp. 36, 68, 70 and 71.

Amer. Dyestuff Reporter, September 15, 1952, pp. P578–P580; for January 21, 1952, p. P39; for November 12, 1951, p. 750.